(12) United States Patent
Siggelkow et al.

(10) Patent No.: US 7,563,291 B2
(45) Date of Patent: Jul. 21, 2009

(54) DEMULSIFIERS FOR MIXTURES OF MIDDLE DISTILLATES WITH FUEL OILS OF VEGETABLE OR ANIMAL ORIGIN AND WATER

(75) Inventors: Bettina Siggelkow, Oberhausen (DE); Dirk Leinweber, Schwalbach (DE); Werner Reimann, Frankfurt (DE); Ulrike Neuhaus, Oberhausen (DE); Renate Braun, Dinslaken (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 975 days.

(21) Appl. No.: 11/132,413

(22) Filed: May 18, 2005

(65) Prior Publication Data

US 2005/0257421 A1 Nov. 24, 2005

(30) Foreign Application Priority Data

May 18, 2004 (DE) .................. 10 2004 024 532

(51) Int. Cl.
*C10L 1/18* (2006.01)
*C10L 1/22* (2006.01)

(52) U.S. Cl. .................. 44/301; 44/393; 44/423; 44/433

(58) Field of Classification Search .................. 44/301, 44/423, 433, 393
See application file for complete search history.

(56) References Cited

U.S. PATENT DOCUMENTS 3,344,083 A 9/1967 Dickson (Continued)

FOREIGN PATENT DOCUMENTS

| DE | 2435713 | 2/1976 |
|---|---|---|
| EP | 0271738 | 6/1988 |
| WO | WO 9318115 | 9/1993 |
| WO | WO 9419430 | 9/1994 |

OTHER PUBLICATIONS

EP Search Report for Corresponding Application 05009924.1, dated Feb. 22, 2006.
English Language Abstract for EP 0271738, dated Jun. 22, 1988.

Primary Examiner—Cephia D Toomer
(74) Attorney, Agent, or Firm—Richard P. Silverman

(57) ABSTRACT

The present invention relates to the preparation of Ω-(dimethylisopropenylbenzylurethane) polyalkylene glycols with α-alkoxy or α-dihydroxy groups and to the use thereof as hydrolysis-stable macromonomers for the dispersion and crosslinking of polymers

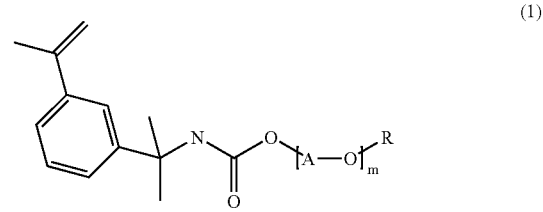

(1)

in which, A is $C_2$-$C_4$-alkylene, m is an integer from 5 to 900, and R is $C_1$-$C_{20}$-alkyl, $C_6$-$C_{18}$-aryl or a radical according to formula 2a, 2b, 2c, 3a, 3b or 3c

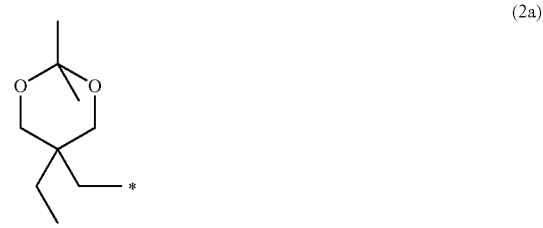

(2a)

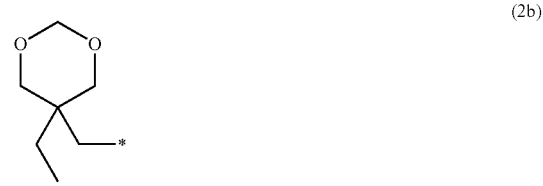

(2b)

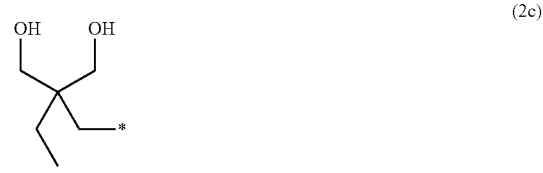

(2c)

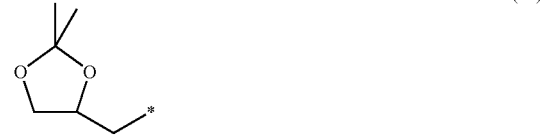

(3a)

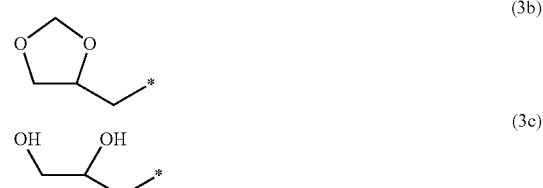

(3b)

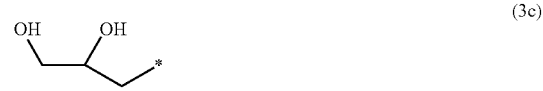

(3c)

which is bonded to the terminal oxygen atom of the alkoxy group (A-O) in formula 1 via the valence denoted by *, and in which A is not exclusively $C_3$- or $C_4$-alkylene.

13 Claims, No Drawings

U.S. PATENT DOCUMENTS

| | | | |
|---|---|---|---|
| 3,907,701 A * | 9/1975 | Liebold et al. | 516/179 |
| 4,211,534 A | 7/1980 | Feldman | |
| 4,546,151 A | 10/1985 | Baur | |
| 4,670,516 A | 6/1987 | Sackmann | |
| 4,713,088 A | 12/1987 | Tack | |
| 4,985,048 A | 1/1991 | Wirtz et al. | |
| 5,186,720 A | 2/1993 | Feustel et al. | |
| 5,391,632 A | 2/1995 | Krull | |
| 5,401,439 A | 3/1995 | Elfers | |
| 5,445,765 A * | 8/1995 | Elfers et al. | 516/179 |
| 5,743,923 A | 4/1998 | Davies | |
| 5,759,409 A | 6/1998 | Knauf | |
| 5,998,530 A | 12/1999 | Krull | |
| 6,391,071 B1 | 5/2002 | Kupetz et al. | |
| 6,461,393 B1 | 10/2002 | Krull | |

\* cited by examiner

DEMULSIFIERS FOR MIXTURES OF MIDDLE DISTILLATES WITH FUEL OILS OF VEGETABLE OR ANIMAL ORIGIN AND WATER

The present invention relates to the use of alkoxylated polyethyleneimines as demulsifiers for mixtures of middle distillates with vegetable or animal fuel oils and water.

In view of decreasing world mineral oil reserves and the discussion about the environmentally damaging consequences of the consumption of fossil and mineral fuels, there is increasing interest in alternative energy sources based on renewable raw materials. These include in particular native oils and fats of vegetable or animal origin. These are generally triglycerides of fatty acids having from 10 to 24 carbon atoms and a calorific value comparable to the conventional fuels, but which are simultaneously classified as biodegradable and environmentally compatible.

Oils obtained from animal or vegetable material are mainly metabolic products which comprise triglycerides of monocarboxylic acids, for example acids having from 10 to 25 carbon atoms, and correspond to the formula

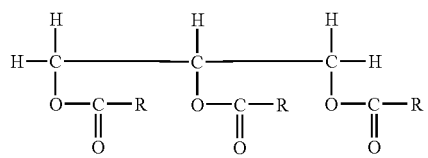

in which R is an aliphatic radical having from 10 to 25 carbon atoms which may be saturated or unsaturated.

In general, such oils comprise glycerides from a series of acids whose number and type vary with the source of the oil, and they may additionally comprise phosphoglycerides. Such oils can be obtained by prior art processes.

As a consequence of the sometimes unsatisfactory physical properties of the triglycerides, the industry has applied itself to converting the naturally occurring triglycerides to fatty acid esters of lower alcohols such as methanol or ethanol. The prior art also includes mixtures of middle distillates with oils of vegetable or animal origin (also referred to herein below as "biofuel oils").

EP-B-0 665 873 discloses a fuel oil composition which comprises a biofuel, a fuel oil based on crude oil and an additive, which comprises (a) an oil-soluble ethylene copolymer or (b) a comb polymer or (c) a polar nitrogen compound or (d) a compound in which at least one substantially linear alkyl group having from 10 to 30 carbon atoms is joined to a nonpolymeric organic radical in order to provide at least one linear chain of atoms which includes the carbon atoms of the alkyl groups and one or more nonterminal oxygen atoms, or (e) one or more of components (a), (b), (c) and (d).

A hindrance to the use of mixtures of middle distillates and biofuel oils is their strong tendency to enter into stable emulsions with water. Such emulsions bring about corrosion problems in the distribution chain of the biofuel oils and when they are used in motor vehicles.

It is thus an object of this invention to find a suitable demulsifier for mixtures of middle distillates, biofuel oils and water.

Polyethyleneimines are known demulsifiers for crude oil. For example, DE-A-22 27 546, DE-A-24 35 713 and DE-A-33 00 866 disclose these properties of the polyethyleneamines.

It has now been found that, surprisingly, certain oligo- and polyethyleneimines which have been alkoxylated with $C_2$-$C_4$-alkylene oxide groups or a mixture of such alkylene oxide groups are excellent demulsifiers for such mixtures.

The invention provides a fuel oil comprising a major proportion of a mixture of
A) a middle distillate fuel oil and
B) a biofuel oil,
and a minor proportion
C) of oil-soluble oligo- or polyethyleneimines which have been alkoxylated with from 1 to 100 $C_2$-$C_4$-alkylene oxide groups or a mixture of such alkylene oxide groups per free NH group.

The invention further provides the use of the oligo- or polyethyleneimine defined under C) as a demulsifier in mixtures of middle distillate fuel oils with biofuel oils and water.

The invention further provides a process for demulsifying water out of mixtures of middle distillate fuel oils with biofuel oils, by adding the above-defined oligo- or polyethyleneimine to the mixtures.

The constituent A) used is a middle distillate fuel oil. This refers especially to those mineral oils which are obtained by distillation of crude oil and boil in the range from 120 to 450° C., for example kerosene, jet fuel, diesel and heating oil. Preference is given to using those middle distillates which contain less than 350 ppm of sulfur, more preferably less than 200 ppm of sulfur, especially less than 50 ppm of sulfur and in special cases less than 10 ppm of sulfur. They are generally those middle distillates which have been subjected to refining under hydrogenating conditions and which therefore contain only small proportions of polyaromatic and polar compounds. They are preferably those middle distillates which have 95% distillation points below 370° C., in particular 350° C. and in special cases below 330° C. The middle distillates preferably have aromatic contents of below 28% by weight, in particular below 20% by weight.

The constituent B) used is a biofuel oil. In a preferred embodiment, the biofuel oil, which is frequently also referred to as "biodiesel" or "biofuel" is a fatty acid alkyl ester of fatty acids having from 14 to 24 carbon atoms and alcohols having from 1 to 4 carbon atoms. Typically, a major proportion of the fatty acids contains one, two or three double bonds. The biofuels are more preferably, for example, rapeseed oil methyl ester and especially mixtures which comprise rapeseed oil fatty acid methyl ester, sunflower oil fatty acid methyl ester and/or soya oil fatty acid methyl ester.

Examples of oils which are derived from animal or vegetable material and which can be used in the inventive composition are rapeseed oil, coriander oil, soya oil, cottonseed oil, sunflower oil, castor oil, olive oil, peanut oil, corn oil, almond oil, palm kernel oil, coconut oil, mustardseed oil, beef tallow, bone oil and fish oils. Further examples include oils which are derived from wheat, jute, sesame, shea tree nut, arachis oil and linseed oil, and can be derived therefrom by processes disclosed in the prior art. It is also possible to use oils which are obtained from used oils such as deep fat fryer oil. Preference is given to rapeseed oil which is a mixture of fatty acids partially esterified with glycerol, since it is obtainable in large amounts and is obtainable in a simple manner by extractively pressing rapeseed. In addition, preference is given to the likewise widespread oils of sunflowers and soya, and to mixtures thereof with rapeseed oil.

Useful lower alkyl esters of fatty acids include the following, for example as commercial mixtures: the ethyl, propyl, butyl and especially methyl esters of fatty acids having from 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, each of which preferably has an iodine number of from 50 to 150, in particular from 90 to 125. Mixtures having particularly advantageous properties are those which comprise mainly, i.e. to an extent of at least 50% by weight, methyl esters of fatty acids having from 16 to 22 carbon atoms and 1, 2 or 3 double bonds. The preferred lower alkyl esters of fatty acids are the methyl esters of oleic acid, linoleic acid, linolenic acid and erucic acid.

Commercial mixtures of the type mentioned are obtained, for example, by hydrolyzing and esterifying animal and vegetable fats and oils by transesterifying them with lower aliphatic alcohols. To prepare lower alkyl esters of fatty acids, it is advantageous to start from fats and oils having a high iodine number, for example sunflower oil, rapeseed oil, coriander oil, castor oil, soya oil, cottonseed oil, peanut oil or beef tallow. Preference is given to lower alkyl esters of fatty acids based on a new type of rapeseed oil whose fatty acid component is derived to an extent of more than 80% by weight from unsaturated fatty acids having 18 carbon atoms.

The mixing ratio of the constituents A and B may vary as desired. It is preferably between A:B=99.9:0.1 and 0.1:99.9, in particular from 99:1 to 1:99, especially from 95:5 to 5:95, for example from 85:15 to 15:85 or from 80:20 to 20:80.

The precursors of the alkoxylated oligo- and polyethyleneimines to be used in the context of the present invention are branched, oligomeric or polymeric amines in which a nitrogen atom always follows two carbon atoms. The ratio of primary to secondary to tertiary nitrogen atoms is preferably, as is typical in the corresponding commercially available products, about 1:2:1. As polymers, they have a molecular weight distribution. In the context of the present invention, preference is given to using those types whose average molar masses ($M_w$ measured by means of light scattering) are greater than 55 000 g/mol. The following formula illustrates the structure of commercial branched polyethyleneimines, in which the ratio of primary to secondary to tertiary nitrogen atoms is about 1:2:1:

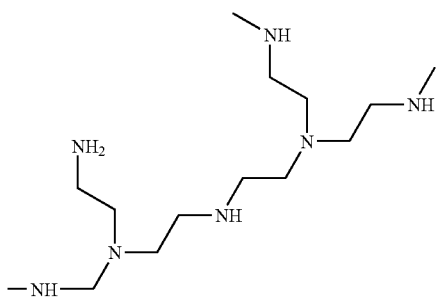

The oligo- or polyethyleneimine, as disclosed in the prior art, is alkoxylated with $C_2$-$C_4$-alkylene oxides or a mixture of such alkylene oxides, so that the alkoxylated oligo- or polyethyleneimine has a preferred degree of alkoxylation of from 2 to 80 alkylene oxide units per free NH group. In particular, the alkoxylated oligo- or polyethyleneimines used are prepared by sequential alkoxylation of ethylene oxide, propylene oxide and/or butylene oxide under alkaline catalysis. Preference is given to those alkoxylated oligo- or polyethyleneimines which are prepared by alkoxylation first with propylene oxide (PO) and subsequently with ethylene oxide (EO). The following structural formulae illustrate by way of example the structure of alkoxylated oligo- (1) or polyethyleneimine (2) used with preference:

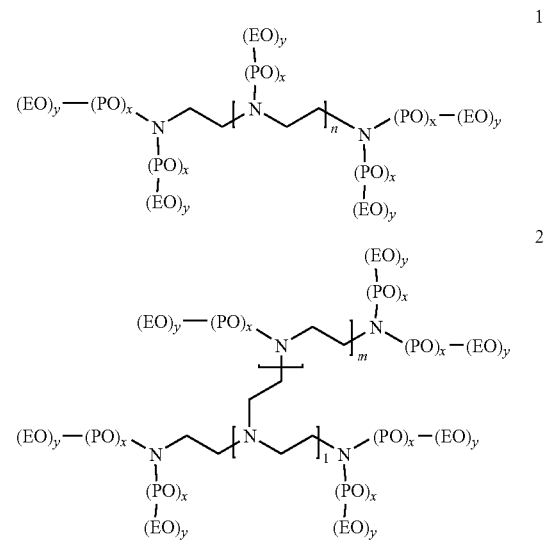

where l, m and n are each independently from 0 to 100 and (x+y) is equal to from 1 to 100.

The compounds C) generally have a molecular weight of more than 55 000 g/mol, preferably of from 55 000 to 1 000 000 g/mol, in particular from 55 000 to 85 000 g/mol, measured by means of gel permeation chromatography (GPC) against polyethylene glycol in tetrahydrofuran.

An important determining parameter for the polymers C is their water number (WN). It is determined to DIN EN 12836. Water is added at a temperature of $(25\pm1)°$ C. to a solvent mixture which consists of dioxane and toluene in a ratio of 97:3, and in which the sample of C) is present as a clear solution, until a persistent opacity occurs. The water number is reported in milliliters of water which are required for the titration to obtain the persistent opacity. The water number of the compounds C) is preferably between 6 ml and 25 ml, in particular between 6 ml and 17 ml.

The alkoxylated oligo- or polyethyleneimines C) are added to the mixtures comprising A) and B) in amounts of from 0.001 to 5% by weight, preferably from 0.005 to 1% by weight and to 0.05% by weight. They may be used as such or else dissolved or dispersed in solvents, for example aliphatic and/or aromatic hydrocarbons or hydrocarbon mixtures, for example toluene, xylene, ethylbenzene, decane, pentadecane, benzine fractions, kerosene, naphtha, diesel, heating oil, isoparaffins or commercial solvent mixtures such as Solvent Naphtha, ®Shellsol AB, ®Solvesso 150, ®Solvesso 200, ®Exxsol, ®Isopar and ®Shellsol D types. They are preferably dissolved in fuel oil of animal or vegetable origin based on fatty acid alkyl esters. The inventive additives preferably contain 1-80%, especially 10-70%, in particular 25-60%, of solvent.

The polymers C) may be added to the oil to be additized in accordance with processes disclosed in the prior art. When more than one compound C) is to be used, such components may be introduced into the oil together or separately in any combination.

To prepare additive packages for specific solutions to problems, the polymers C) may also be used together with one or more oil-soluble coadditives which even alone improve the properties of crude oils, lubricant oils or fuel oils. Examples of such coadditives are polar compounds which bring about paraffin dispersancy (paraffin dispersants), alkylphenol-aldehyde resins, polymeric cold flow improvers and oil-soluble amphiphiles.

For instance, outstandingly useful mixtures have been found to be those of the polymers C) with those copolymers which contain from 10 to 40% by weight of vinyl acetate and from 60 to 90% by weight of ethylene. In a further embodiment of the invention, the inventive additives are used in a mixture with ethylene/vinyl acetate/vinyl 2-ethylhexanoate terpolymers, ethylene/vinyl acetate/vinyl neononanoate terpolymers and/or ethylene/vinyl acetate/vinyl neodecanoate terpolymers to simultaneously improve the flowability and lubricity of mineral oils or mineral oil distillates. The terpolymers of vinyl 2-ethylhexanate, vinyl neononanoate or of vinyl neodecanoate contain, apart from ethylene, from 8 to 40% by weight of vinyl acetate and from 1 to 40% by weight of the particular long-chain vinyl ester. Further preferred copolymers contain, in addition to ethylene and from 10 to 40% by weight of vinyl esters and/or from 1 to 40% by weight of long-chain vinyl esters, 0.5 to 20% by weight of olefins having from 3 to 10 carbon atoms, for example isobutylene, diisobutylene, propylene, methylpentene or norbornene.

The paraffin dispersants are preferably low molecular weight or polymeric, oil-soluble compounds having ionic or polar groups, for example amine salts, imides and/or amides. Particularly preferred paraffin dispersants comprise reaction products of primary and/or secondary fatty amines having from 8 to 36 carbon atoms, in particular dicoconut fatty amine, ditallow fatty amine and distearylamine. Particularly useful paraffin dispersants have been found to be those which are obtained by reaction of aliphatic or aromatic amines, preferably long-chain aliphatic amines, with aliphatic or aromatic mono-,di-, tri- or tetracarboxylic acids or anhydrides thereof (cf. U.S. Pat. No. 4,211,534). Other paraffin dispersants are copolymers of maleic anhydride and α,β-unsaturated compounds which can optionally be reacted with primary monoalkylamines and/or aliphatic alcohols (cf. EP-A-0 154 177), the reaction products of alkenyl-spiro-bislactones with amines (cf. EP-A-0 413 279 B1) and, according to EP-A-0 606 055 A2, reaction products of terpolymers based on α,β-unsaturated dicarboxylic anhydrides, α,β-unsaturated compounds and polyoxyalkylene ethers of lower unsaturated alcohols.

Suitable coadditives which bring about paraffin dispersancy are, for example, esters. These esters are derived from polyols having 3 or more OH groups, especially from glycerol, trimethylolpropane, pentaerythritol and the oligomers, obtainable therefrom by condensation, having from 2 to 10 monomer units, for example polyglycerol. The polyols are generally reacted with from 1 to 100 mol of alkylene oxide, preferably from 3 to 70 mol, in particular from 5 to 50 mol of alkylene oxide per mol of polyol. Preferred alkylene oxides are ethylene oxide, propylene oxide and butylene oxide. The alkoxylation is effected by known processes.

The fatty acids suitable for the esterification of the alkoxylated polyols have preferably from 8 to 50, in particular from 12 to 30, especially from 16 to 26 carbon atoms. Suitable fatty acids are, for example, lauric, tridecanoic, myristic, pentadecanoic, palmitic, margaric, stearic, isostearic, arachic and behenic acid, oleic and erucic acid, palmitoleic, myristoleic, ricinoleic acid, and fatty acid mixtures obtained from natural fats and oils. Preferred fatty acid mixtures contain more than 50% fatty acids having at least 20 carbon atoms. Preferably less than 50% of the fatty acids used for the esterification contain double bonds, in particular less than 10%; they are especially very substantially saturated. Very substantially saturated refers here to an iodine number of the fatty acid used of up to 5 g of I per 100 g of fatty acid. The esterification may also be effected starting from reactive derivatives of the fatty acids such as esters with lower alcohols (for example methyl or ethyl esters) or anhydrides.

For the esterification of the alkoxylated polyols, it is also possible to use mixtures of the above fatty acids with fat-soluble, polybasic carboxylic acids. Examples of suitable polybasic carboxylic acids are dimer fatty acids, alkenylsuccinic acids and aromatic polycarboxylic acids, and derivatives thereof such as anhydrides and $C_1$ to $C_5$ esters. Preference is given to alkenylsuccinic acids and derivatives thereof having alkyl radicals having from 8 to 200, in particular from 10 to 50, carbon atoms. Examples are dodecenyl-, octadecenyl- and poly(isobutenyl)succinic anhydride. Preference is given to using the polybasic carboxylic acids in minor amounts of up to 30 mol %, preferably from 1 to 20 mol %, in particular from 2 to 10 mol %.

Esters and fatty acids are used for the esterification, based on the content of firstly hydroxyl groups and secondly carboxyl groups, in a ratio of from 1.5:1 to 1:1.5, preferably from 1.1:1 to 1:1.1, in particular in equimolar amounts. The paraffin-dispersing action is particularly marked when an acid excess of up to 20 mol %, especially up to 10 mol %, in particular up to 5 mol %, is used.

The esterification is carried out by customary processes. A particularly useful process has been found to be the reaction of polyol alkoxylate with fatty acid, optionally in the presence of catalysts, for example para-toluenesulfonic acid, $C_2$- to $C_{50}$-alkylbenzenesulfonic acids, methanesulfonic acid or acidic ion exchangers. The removal of the water of reaction may be effected distillatively by direct condensation or preferably by means of azeotropic distillation in the presence of organic solvents, in particular of aromatic solvents such as toluene, xylene or else higher-boiling mixtures such as ®Shellsol A, Shellsol B, Shellsol AB or Solvent Naphtha. The esterification is preferably effected to completion, i.e. from 1.0 to 1.5 mol of fatty acid are used per mole of hydroxyl groups for the esterification. The acid number of the esters is generally below 15 mg KOH/g, preferably below 10 mg KOH/g, especially below 5 mg KOH/g.

Particularly preferred paraffin dispersants are prepared by reaction of compounds which contain an acyl group with an amine. This amine is a compound of the formula $NR^6R^7R^8$ where $R^6$, $R^7$ and $R^8$ may be the same or different and at least one of these groups is $C_8$-$C_{36}$-alkyl, $C_6$-$C_{36}$-cycloalkyl, $C_8$-$C_{36}$-alkenyl, in particular $C_{12}$-$C_{24}$-alkyl, $C_{12}$-$C_{24}$-alkenyl or cyclohexyl, and the remaining groups are either hydrogen, $C_1$-$C_{36}$-alkyl, $C_2$-$C_{36}$-alkenyl, cyclohexyl, or a group of the formulae -(A-O)$_x$-E or —(CH$_2$)$_n$—NYZ where A is an ethylene or propylene group, x is a number from 1 to 50, E=H, $C_1$-$C_{30}$-alkyl, $C_5$-$C_{12}$-cycloalkyl or $C_6$-$C_{30}$-aryl, and n is 2, 3 or 4, and Y and Z are each independently H, $C_1$-$C_{30}$-alkyl or -(A-O)$_x$. Acyl group refers here to a functional group of the following formula:

$$>C=O$$

The paraffin dispersants may be added to the polymers C) or added separately to the middle distillates to be additized.

Suitable paraffin dispersants are also alkylphenol-aldehyde resins. Alkylphenol-aldehyde resins are known in principle and are described, for example, in Römpp Chemie Lexikon, 9th edition, Thieme Verlag 1988-92, volume 4, p. 3351ff. The alkyl or alkenyl radicals of the alkylphenol have 6-24, preferably 8-22, in particular 9-18 carbon atoms. They may be linear or preferably branched, in which case the branch may contain secondary and also tertiary structural elements. The alkyl or alkenyl radicals are preferably n- and isohexyl, n- and isooctyl, n- and isononyl, n- and isodecyl, n- and isododecyl, tetradecyl, hexadecyl, octadecyl, eicosyl and also tripropenyl, tetrapropenyl, pentapropenyl and poly-isobutenyl up to $C_{24}$. The alkylphenol-aldehyde resin may also contain up to 20 mol % of phenol units and/or alkylphenols having short alkyl chains, for example butylphenol. For the alkylphenol-aldehyde resin, the same or different alkylphenols may be used.

The aldehyde in the alkylphenol-aldehyde resin has from 1 to 10, preferably from 1 to 4 carbon atoms and may bear further functional groups. It is preferably an aliphatic aldehyde, more preferably formaldehyde.

The molecular weight of the alkylphenol-aldehyde resins is preferably 350-10 000 g/mol, in particular 400-5000 g/mol. This preferably corresponds to a degree of condensation n of from 3 to 40, in particular from 4 to 20. A prerequisite is that the resins are oil-soluble.

In a preferred embodiment of the invention, these alkylphenolformaldehyde resins are those which are oligo- or polymers having a repeating structural unit of the formula

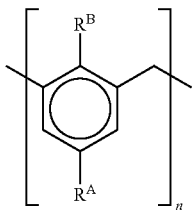

where $R^A$ is $C_4$ to $C_{30}$-, in particular $C_6$- to $C_{24}$-alkyl or -alkenyl, $R^B$ is OH or O-(A-O)$_x$—H where A=$C_2$-$C_4$-alkylene and x=from 1 to 50, and n is a number from 2 to 50, in particular from 5 to 40 and especially from 7 to 12.

The alkylphenol-aldehyde resins are prepared in a known manner by basic catalysis to form condensation products of the resol type, or by acidic catalysis to form condensation products of the novolak type.

The condensates obtained in both ways are suitable for the inventive compositions. Preference is given to condensation in the presence of acidic catalysts.

To prepare the alkylphenol-aldehyde resins, an alkylphenol having 6-24, preferably 8-22, in particular 9-18, carbon atoms per alkyl group, or mixtures thereof, and at least one aldehyde are reacted with one another, and about 0.5-2 mol, preferably 0.7-1.3 mol and in particular equimolar amounts of aldehyde are used per mole of alkylphenol compound.

Suitable alkylphenols are in particular n- and isohexylphenol, n- and isooctylphenol, n- and isononylphenol, n- and isodecylphenol, n- and isododecylphenol, tetradecylphenol, hexadecylphenol, octadecylphenol, eicosylphenol, tripropenylphenol, tetrapropenylphenol and poly(isobutenyl)phenol up to $C_{24}$.

The alkylphenols are preferably para-substituted. The alkylphenols may bear one or more alkyl radicals. They are substituted by more than one alkyl group preferably to an extent of at most 5 mol %, in particular to an extent of at most 20 mol % and especially at most 40 mol %. Preferably at most 40 mol %, in particular at most 20 mol %, of the alkylphenols used bear an alkyl radical in the ortho-position. The alkylphenols are especially not substituted by tertiary alkyl groups in the ortho-position to the hydroxyl group.

The aldehyde may be a mono- or dialdehyde and bear further functional groups such as —COOH. Particularly suitable aldehydes are formaldehyde, acetaldehyde, butyraldehyde, glutaraldehyde and glyoxalic acid, preference is given to formaldehyde. The formaldehyde may be used in the form of paraformaldehyde or in the form of a preferably 20-40% by weight aqueous formalin solution. It is also possible to use corresponding amounts of trioxane.

The reaction of alkylphenol and aldehyde is effected typically in the presence of alkaline catalysts, for example alkali metal hydroxides or alkylamines, or of acidic catalysts, for example inorganic or organic acids such as hydrochloric acid, sulfuric acid, phosphoric acid, sulfonic acid, sulfamido acids or haloacetic acids, and in the presence of an organic solvent which forms an azeotrope with water, for example toluene, xylene, higher aromatics or mixtures thereof. The reaction mixture is heated to a temperature of from 90 to 200° C., preferably 100-160° C., and the water of reaction formed is removed by azeotropic distillation during the reaction. Solvents which do not release any protons under the conditions of the condensation may remain in the products after the condensation reaction. The resins may be used directly or after neutralization of the catalyst, optionally also after further dilution of the solution with aliphatic and/or aromatic hydrocarbons or hydrocarbon mixtures, for example benzine fractions, kerosene, decane, pentadecane, toluene, xylene, ethylbenzene or solvents such as ®Solvent Naphtha, ®Shellsol AB, ®Solvesso 150, ®Solvesso 200, ®Exxsol, ®ISOPAR and ®Shellsol D types.

Finally, in a further embodiment of the invention, the polymers C) are used together with comb polymers. This refers to polymers in which hydrocarbon radicals having at least 8, in particular at least 10, carbon atoms are bonded to a polymer backbone. They are preferably homopolymers whose alkyl side chains contain at least 8 and in particular at least 10 carbon atoms. In copolymers, at least 20%, preferably at least 30%, of the monomers have side chains (cf. Comb-like Polymers-Structure and Properties; N. A. Platé and V. P. Shibaev, J. Polym. Sci. Macromolecular Revs. 1974, 8, 117 ff). Examples of suitable comb polymers are, for example, fumarate/vinyl acetate copolymers (cf. EP 0 153 176 A1), copolymers of a $C_6$-$C_{24}$-α-olefin and an N-$C_6$-$C_{22}$-alkylmaleimide (cf. EP-A-0 320 766), and also esterified olefin/maleic anhydride copolymers, polymers and copolymers of α-olefins and esterified copolymers of styrene and maleic anhydride.

Comb polymers can be described, for example, by the formula

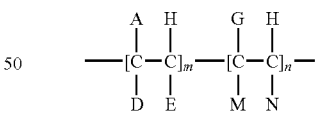

In this formula,

A is R', COOR', OCOR', R"-COOR' or OR';

D is H, CH$_3$, A or R;

E is H or A;

G is H, R", R"-COOR', an aryl radical or a heterocyclic radical;

M is H, COOR", OCOR", OR" or COOH;

N is H, R", COOR", OCOR", COOH or an aryl radical;

R' is a hydrocarbon chain having 8-150 carbon atoms;

R" is a hydrocarbon chain having from 1 to 10 carbon atoms;

m is a number between 0.4 and 1.0; and n is a number between 0 and 0.6.

The mixing ratio (in parts by weight) of the polymers C) with polymeric cold flow improvers, paraffin dispersants, comb polymers or resins is in each case from 1:1000 to 1:1, preferably from 1:10 to 1:50.

The polymers C) may be used alone or else together with other additives, for example with other pour point depressants or dewaxing assistants, with corrosion inhibitors, antioxidants, lubricity additives, sludge inhibitors, dehazers and additives for lowering the cloud point.

EXAMPLES

Characterization of the Test Oils:
The CFPP value is determined to EN 116, the characteristic boiling data to ASTM D-86 and the cloud point to ISO 3015.

TABLE 1

Analysis of the biodiesel used

| Oil No. | | CP | CFPP |
|---|---|---|---|
| E 1 | Rapeseed oil methyl ester (RME) | −2.3° C. | −14° C. |
| E 2 | 90% rapeseed oil methyl ester (RME) + 10% soya oil methyl ester (soyaME) | −2.0° C. | −8° C. |

TABLE 2

Carbon chain distribution of the fatty acid methyl esters used to prepare the test oils (main constituents; area % by GC)

| | $C_{16}$ | $C_{16}'$ | $C_{18}$ | $C_{18}'$ | $C_{18}''$ | $C_{18}'''$ | $C_{20}$ | $C_{20}'$ | $C_{22}$ | $\Sigma$ saturated |
|---|---|---|---|---|---|---|---|---|---|---|
| RME | 4.4 | 0.4 | 1.6 | 57.8 | 21.6 | 8.8 | 1.5 | 0.7 | 0.2 | 7.7 |
| SoyaME | 10.4 | 0.1 | 4.1 | 24.8 | 51.3 | 6.9 | 0.5 | 0.4 | 0.4 | 15.4 |

($C_{18}'$ means 1 double bond, $C_{18}''$ means 2 double bonds, etc.)

($C_{18}'$ means 1 double bond, $C_{18}''$ means 2 double bonds, etc.)

TABLE 3

Characterization of the middle distillates used

| | F1 | F2 | F3 | F4 |
|---|---|---|---|---|
| Sulfur content, ppm | 7.9 | 4.9 | 32.0 | 900 |
| Density, g/cm³ | 0.8436 | 0.8306 | 0.8348 | 0.8487 |
| Initial boiling point, ° C. | 209.9 | 143.9 | 209.1 | 203.7 |
| Final boiling point, ° C. | 334.6 | 363.2 | 347.8 | 365.6 |
| Boiling range (90-20), ° C. | 63.5 | 87.6 | 83.8 | 94.9 |
| Aromatics content, % by wt. | 25.7 | 16.5 | 20.5 | 29.9 |

TABLE 4

Characterization of the polymers C

| Polymer | $M_w$ [g/mol] | Water number [ml] |
|---|---|---|
| P1 | 250000 | 7.9 |
| P2 | 500000 | 8.5 |
| P3 | 750000 | 6.6 |
| P4 | 800000 | 6.0 |
| P5 | 60000 | 7.1 |
| P6 | 55000 | 9.3 |

TABLE 5

Characterization of the flow improvers

| Polymer | Comonomer(s) | $V_{140}$ | Degree of branching $CH_3/100CH_2$ |
|---|---|---|---|
| P7 | 13.6 mol % of vinyl acetate | 130 mPas | 3.7 |
| P8 | 15.9 mol % of vinyl acetate and 1.2 mol % of vinyl neodecanoate | 105 mPas | 5.5 |
| P9 | 9.4 mol % of vinyl acetate | 220 mPas | 6.2 |

Effectiveness as a Demulsifier

The emulsification tendency of additives is tested to ASTM D 1094-85. 80 ml of a diesel fuel (here a mixture of mineral diesel and biodiesel) are admixed in a 100 ml measuring cylinder with 250 ppm of the additive to be tested and heated at 60° C. for 15 minutes and then agitated. After cooling to room temperature, 20 ml of buffer solution (pH=7) are added and the mixture is agitated for 2 minutes. After 5 minutes the sample is assessed visually according to the following criteria:

| | Assessment of the separation layer | | Assessment of the phase separation |
|---|---|---|---|
| 1 | Clear and clean | 1 | Complete absence of any emulsions and/or deposits in both phases or on top of the oil phase. |
| 1b | Small, clear bubbles which are estimated to cover not more than 50% of the separation layer. No streaks, no film formation or other wetting at the separation layer. | | |
| | | 2 | As (1), but additionally small air bubbles or small water droplets in the oil phase. |
| 2 | Streaks, film formation or other wetting on the separation layer | 3 | Emulsions and/or deposits in both phases or on top of the oil phase, and/or drops in the water phase or adhering to the wall (excluding the wall above the oil phase). In brackets: amount of the water phase |
| 3 | Narrow border or slight foam formation, or both | | |
| 4 | Thick border or extensive foam formation, or both | | |

TABLE 6

Effectiveness of copolymers as a demulsifier in a mixture of 95% by weight of F2 and 5% by weight of biodiesel E1

| Ex. No. | Polymer | Separation layer | Phase separation | | Oil phase | Water phase | Dosage of polymer in ppm |
|---|---|---|---|---|---|---|---|
| 1(C) | — | 3-4 | 12 ml | 3 | opaque | clear | — |
| 2(C) | P7 | 4 | 14 ml | 3 | opaque | clear | 250 |
| 3(C) | P8 | 3 | 15 ml | 3 | opaque | clear | 250 |
| 4(C) | P9 | 4 | 17 ml | 3 | opaque | clear | 250 |
| 5 | P1 | 1 | 20 ml | 3 | opaque | clear | 250 |
| 6 | P2 | 1b | 20 ml | 3 | opaque | clear | 250 |
| 7 | P3 | 1 | 20 ml | 3 | opaque | clear | 250 |
| 8 | P4 | 1b | 20 ml | 3 | opaque | clear | 250 |
| 9 | P5 | 1 | 20 ml | 3 | opaque | clear | 250 |
| 10 | P6 | 1 | 20 ml | 3 | opaque | clear | 250 |
| 11 | P1 | 1 | 20 ml | 3 | opaque | clear | 100 |
| 12 | P1 | 1 | 20 ml | 3 | opaque | clear | 50 |
| 13 | P1 | 1 | 20 ml | 3 | opaque | clear | 25 |
| 14 | P1 | 1b | 20 ml | 3 | opaque | clear | 10 |
| 15 | P3 | 1 | 20 ml | 3 | opaque | clear | 100 |
| 16 | P3 | 1 | 20 ml | 3 | opaque | clear | 50 |
| 17 | P3 | 1b | 20 ml | 3 | opaque | clear | 25 |
| 18 | P3 | 1b | 19 ml | 3 | opaque | clear | 10 |
| 19 | P5 | 1 | 20 ml | 3 | opaque | clear | 50 |
| 20 | P5 | 1 | 20 ml | 3 | opaque | clear | 25 |

* distinct phase separation even after a short time (1 to 2 min.)

TABLE 7

Effectiveness of copolymers as a demulsifier in a mixture of 95% by weight of F2 and 5% by weight of biodiesel E2

| Ex. No. | Polymer | Separation layer | Phase separation | | Oil phase | Water phase | Dosage of polymer in ppm |
|---|---|---|---|---|---|---|---|
| 21 (C) | — | 3-4 | 14 ml | 3 | opaque | clear | — |
| 22 (C) | P7 | 4 | 13 ml | 3 | opaque | clear | 250 |
| 23 (C) | P8 | 3 | 17 ml | 3 | opaque | clear | 250 |
| 24 (C) | P9 | 4 | 16 ml | 3 | opaque | clear | 250 |
| 25 | P1 | 1 | 20 ml | 3 | opaque | clear | 250 |
| 26 | P2 | 1 | 20 ml | 3 | opaque | clear | 250 |
| 27 | P3 | 1b | 20 ml | 3 | opaque | clear | 250 |
| 28 | P4 | 1 | 20 ml | 3 | opaque | clear | 250 |
| 29 | P5 | 1 | 20 ml | 3 | opaque | clear | 250 |
| 30 | P6 | 1b | 20 ml | 3 | opaque | clear | 250 |
| 31 | P1 | 1 | 20 ml | 3 | opaque | clear | 100 |
| 32 | P1 | 1 | 20 ml | 3 | opaque | clear | 50 |
| 33 | P1 | 1 | 20 ml | 3 | opaque | clear | 25 |
| 34 | P1 | 1 | 20 ml | 3 | opaque | clear | 10 |
| 35 | P3 | 1b | 20 ml | 3 | opaque | clear | 100 |
| 36 | P3 | 1b | 20 ml | 3 | opaque | clear | 50 |
| 37 | P3 | 1b | 20 ml | 3 | opaque | clear | 25 |
| 38 | P3 | 1b | 19 ml | 3 | opaque | clear | 10 |
| 39 | P5 | 1 | 20 ml | 3 | opaque | clear | 50 |
| 40 | P5 | 1 | 20 ml | 3 | opaque | clear | 25 |

* distinct phase separation even after a short time (1 to 2 min.)

TABLE 8

Influence of different mixing ratios between middle distillate and biofuel on the emulsification behavior

| Example | Middle distillate | Biofuel | Polymer C) | Separation layer | Phase separation | Amount [ml] of water phase | Oil phase | Water phase | Dosage of polymer C) in ppm |
|---|---|---|---|---|---|---|---|---|---|
| 41 (C) | 90% F1 | 10% E1 | — | 3-4 | 3 | 11 | opaque | clear | — |
| 42 (C) | 95% F1 | 5% E1 | — | 1b | 3 | 18 | opaque | clear | — |
| 43 | 90% F1 | 10% E1 | P1 | 1 | 3 | 20 | opaque | clear | 25 |
| 44 (C) | 90% F2 | 10% E1 | — | 3-4 | 3 | 9 | opaque | clear | — |
| 45 (C) | 95% F2 | 5% E1 | — | 3-4 | 3 | 12 | opaque | clear | — |
| 46 | 90% F2 | 10% E1 | P3 | 1b | 3 | 20 | opaque | clear | 25 |
| 47 (C) | 90% F3 | 10% E1 | — | 4 | 3 | 13 | opaque | clear | — |
| 48 (C) | 95% F3 | 5% E1 | — | 4 | 3 | 9 | opaque | clear | — |
| 49 | 90% F3 | 10% E1 | P5 | 1 | 3 | 20 | opaque | clear | 25 |
| 50 (C) | 90% F1 | 10% E2 | — | 4 | 3 | 8 | opaque | clear | — |
| 51 (C) | 95% F1 | 5% E2 | — | 3 | 3 | 12 | opaque | clear | — |
| 52 | 90% F1 | 10% E2 | P1 | 1 | 3 | 20 | opaque | clear | 25 |
| 53 (C) | 90% F2 | 10% E2 | — | 4 | 3 | 10 | opaque | clear | — |
| 54 (C) | 95% F2 | 5% E2 | — | 3-4 | 3 | 14 | opaque | clear | — |
| 55 | 90% F2 | 10% E2 | P3 | 1b | 3 | 20 | opaque | clear | 25 |
| 56 (C) | 90% F3 | 10% E2 | — | 3-4 | 3 | 11 | opaque | clear | — |
| 57 (C) | 95% F3 | 5% E2 | — | 3 | 3 | 15 | opaque | clear | — |
| 58 | 90% F3 | 10% E2 | P5 | 1 | 3 | 20 | opaque | clear | 25 |

Influence of the Oligo- or Polyethyleneimine on the Effect of Cold Flow Properties A middle distillate (F4) having a CFPP of −7° C. and a mixture thereof with 5% of the biofuel described (CFPP of the mixture likewise −7° C.) with cold flow improver and polyethyleneimines and a middle distillate (F2) having a CFPP of −12° C. and a mixture thereof with 5% of the biofuel described (CFPP of the mixture likewise −12° C.) with cold flow improver and polyethyleneimines was investigated.

TABLE 9

Influence on the cold flow properties by the polymers C)

| Example | Fuel oil | 300 ppm P7 | 300 ppm P7 + 25 ppm P5 | 400 ppm P8 | 400 ppm P8 + 10 ppm P4 |
|---|---|---|---|---|---|
| 59 (C) | F4 | −16° C. | −17° C. | — | — |
| 60 | F4 + E1 | −17° C. | −17° C. | — | — |
| 61 (C) | F2 | — | — | −26° C. | −27° C. |
| 62 | F2 + E1 | — | — | −26° C. | −26° C. |

Influence of the Oligo- or Polyethyleneimines on the Emulsification Behavior of the Diesel/Biodiesel Mixture in the Presence of Flow Improvers The emulsification behavior of the oil F4 with addition of 5% by weight of biofuel E1 or E2 was distinctly altered by the addition of 10 ppm of P1 and exhibited hardly any emulsification tendency in spite of the presence of 300 ppm of a flow improver.

TABLE 10

Influence of cold flow improvers on the emulsification tendency with and without polymer C)

| Ex. | Oil | Cold additive | Separation layer | Phase separation | Oil phase | Water phase | Dosage of polymer C) [ppm] |
|---|---|---|---|---|---|---|---|
| 63 (C) | F4 | P7 | 1b | 20 ml 3 | opaque | clear | — |
| 64 (C) | F4 + E1 | P7 | 3 | 14 ml 3 | opaque | clear | — |
| 65 | F4 + E1 | P7 | 1 | 20 ml 3 | opaque | clear | 250 ppm P1 |
| 66 | F4 + E1 | P7 | 1 | 20 ml 3 | opaque | clear | 10 ppm P1 |
| 67 | F4 + E2 | P7 | 1 | 20 ml 3 | opaque | clear | 250 ppm P1 |
| 68 | F4 + E2 | P7 | 1 | 20 ml 3 | opaque | clear | 10 ppm P1 |

TABLE 10-continued

Influence of cold flow improvers on the emulsification tendency with and without polymer C)

| Ex. | Oil | Cold additive | Separation layer | Phase separation | | Oil phase | Water phase | Dosage of polymer C) [ppm] |
|---|---|---|---|---|---|---|---|---|
| 69 | F4 + E1 | P7 | 1 | 20 ml | 3 | opaque | clear | 25 ppm P5 |
| 70 | F4 + E2 | P7 | 1b | 20 ml | 3 | opaque | clear | 25 ppm P5 |
| 71 (C) | F4 | P8 | 1b | 20 ml | 3 | opaque | clear | — |
| 72 (C) | F4 + E1 | P8 | 3 | 13 ml | 3 | opaque | clear | — |
| 73 | F4 + E1 | P8 | 1 | 20 ml | 3 | opaque | clear | 250 ppm P1 |
| 74 | F4 + E1 | P8 | 1 | 20 ml | 3 | opaque | clear | 10 ppm P1 |
| 75 | F4 + E2 | P8 | 1 | 20 ml | 3 | opaque | clear | 250 ppm P1 |
| 76 | F4 + E2 | P8 | 1b | 20 ml | 3 | opaque | clear | 10 ppm P1 |
| 77 | F4 + E1 | P8 | 1 | 20 ml | 3 | opaque | clear | 25 ppm P5 |
| 78 | F4 + E2 | P8 | 1 | 20 ml | 3 | opaque | clear | 25 ppm P5 |

What is claimed is:

1. A fuel oil comprising a major proportion of a mixture of
A) a middle distillate fuel oil and
B) a biofuel oil, and a minor proportion
C) of an oil-soluble oligo- or polyethyleneimine which has been alkoxylated with from 1 to 100 $C_2$-$C_4$-alkylene oxide groups or a mixture of said alkylene oxide groups per free NH group.

2. The fuel oil as claimed in claim 1, wherein a mixing ratio A):B) is from 99:1 to 1:99.

3. The fuel oil of claim 1, wherein the alkoxylated oligo- or polyethyleneimine C) has a molecular weight of between 55 000 and 1 000 000 g/mol.

4. The fuel oil of claim 1, wherein the alkoxylated oligo- or polyethyleneimine C) has a water number of from 6 to 25 ml.

5. The fuel oil of claim 1, wherein the alkoxylated oligo- or polyethyleneimine C) has a degree of alkoxylation of from 2 to 80 alkylene oxide units per free NH group.

6. The fuel oil of claim 1, wherein the alkoxylated oligo- or polyethyleneimine C) corresponds to the formulae 1 and 2

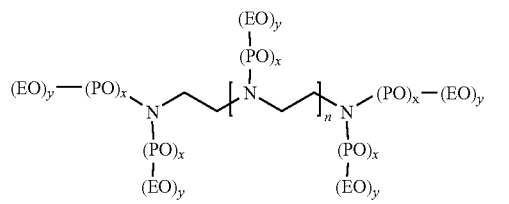

where l, m and n are each independently from 0 to 100 and (x+y) is equal to from 1 to 100.

7. The fuel oil of claim 1, wherein C) is from 0.001 to 5% by weight.

8. The fuel oil of claim 1, wherein the mixture further comprises at least one alkylphenol-formaldehyde resin of the formula

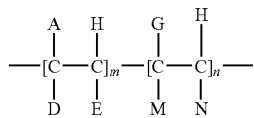

where $R^A$ is $C_4$-$C_{30}$-alky or -alkenyl, $R^B$ is OH or O-(A-O)$_x$-H wheren A=$C_2$-$C_4$-alkylene and x=from 1 to 50, and n is from 2 to 50.

9. The fuel oil of claim 1, which further comprises at least one copolymer which comprises from 60 to 90% by weight of ethylene, and a comonomer selected from the group consisting of from 10 to 40% by weight of vinyl acetate, from 1 to 40% by weight of a long-chain vinylester, from 0.5 to 20% by weight of an olefin, and mixtures thereof.

10. The fuel oil of claim 1, which further comprises at least one amine salt, imide or amide of a primary and/or secondary fatty amine having from 8 to 36 carbon atoms.

11. The fuel oil of claim 1, which further comprises at least one copolymer which is derived from an amide, an imide, an ester and mixtures thereof of an acid selected from the group consisting of maleic acid, fumaric acid, itaconic acid, and mixtures thereof.

12. The fuel oil of claim 1, which further comprises a comb polymer of the formula $$-[\underset{\underset{D}{|}}{\overset{\overset{A}{|}}{C}}-\underset{\underset{E}{|}}{\overset{\overset{H}{|}}{C}}]_m-[\underset{\underset{M}{|}}{\overset{\overset{G}{|}}{C}}-\underset{\underset{N}{|}}{\overset{\overset{H}{|}}{C}}]_n-$$

where
- A is R', COOR', OCOR', R"-COOR' or OR';
- D is H, CH$_3$, A or R;
- E is H or A;
- G is H, R", R"-COOR', an aryl radical or a heterocyclic radical;
- M is H, COOR", OCOR", OR" or COOH;
- N is H, R", COOR", OCOR", COOH or an aryl radical;
- R' is a hydrocarbon chain having 8-150 carbon atoms;
- R" is a hydrocarbon chain having from 1 to 10 carbon atoms;
- m is between 0.4 and 1.0; and
- n is between 0 and 0.6.

13. A method for the demulsification of mixtures of middle distillate fuel oils, biofuel oils, and water, said method comprising adding to said mixture an oil-soluble oligo- or polyethyleneimine which have been alkoxylated with from 1 to 100 C$_2$-C$_4$-alkylene oxide groups or a mixture of said alkylene oxide groups per free NH group.

* * * * *